(12) United States Patent
Knapp

(10) Patent No.: US 12,398,741 B2
(45) Date of Patent: Aug. 26, 2025

(54) CONNECTOR FOR TWO WORKPIECES

(71) Applicant: Knapp Holding GMBH, Euratsfeld (AT)

(72) Inventor: Friedrich Knapp, Bad Kreuzen (AT)

(73) Assignee: Knapp Holding GmbH, Euratsfeld (AT)

( * ) Notice: Subject to any disclaimer, the term of this patent is extended or adjusted under 35 U.S.C. 154(b) by 227 days.

(21) Appl. No.: 18/027,515

(22) PCT Filed: Oct. 12, 2021

(86) PCT No.: PCT/EP2021/078147
§ 371 (c)(1),
(2) Date: Mar. 21, 2023

(87) PCT Pub. No.: WO2022/079007
PCT Pub. Date: Apr. 21, 2022

(65) Prior Publication Data
US 2023/0375018 A1    Nov. 23, 2023

(30) Foreign Application Priority Data
Oct. 14, 2020 (EP) .................................... 20201716

(51) Int. Cl.
*F16B 5/00* (2006.01)
*F16B 15/00* (2006.01)

(52) U.S. Cl.
CPC ........ *F16B 5/0044* (2013.01); *F16B 15/0053* (2013.01)

(58) Field of Classification Search
CPC ........... E04B 1/2604; E04B 2001/2409; E04B 2001/2628; E04B 2001/2644; F16B 5/0036; F16B 5/0044; F16B 15/0053
See application file for complete search history.

(56) References Cited

U.S. PATENT DOCUMENTS 924,912 A    6/1909  Maydl
2007/0154258 A1*  7/2007  Knapp ................... F16B 12/32
                                                             403/331
(Continued)

FOREIGN PATENT DOCUMENTS

DE          20321453 U1   6/2007
DE       202008008130 U1   9/2008
(Continued)

OTHER PUBLICATIONS

International Search Report corresponding to International Application No. PCT/EP2021/078147, dated Jun. 15, 2022.
(Continued)

*Primary Examiner* — Christine T Cajilig
(74) *Attorney, Agent, or Firm* — Hoffmann & Baron, LLP

(57) ABSTRACT

The invention relates to a connector for two workpieces, comprising two fittings which each have a mounting face for a workpiece and an opposite connecting face, on which they can be hooked into one another in a hooking direction extending in parallel with the connecting face. Each fitting comprises, on its connecting face, a shoulder which extends transversely to the hooking direction over its entire width and comprises an undercut, which leaves a ridge on the shoulder. The end face of each fitting remote from the shoulder and adjacent to the connecting face has a lip adjacent to the connecting face and extending over its entire width transversely to the hooking direction. The lip of each fitting engages in the undercut in the respective other fitting in a first position of the fittings in which they are hooked into one another.

20 Claims, 5 Drawing Sheets

(56) References Cited

U.S. PATENT DOCUMENTS

2009/0110473 A1* 4/2009 Okura ................... E04B 1/2604
                                                          403/178
2021/0230858 A1* 7/2021 Daudet ................. E04B 1/2612

FOREIGN PATENT DOCUMENTS

DE   102009060405 A1      6/2011
EP        3910122 A4 *  11/2021   ........... E04B 1/2604
JP         02300442 A    12/1990
WO     WO-9600332 A2 *   1/1996   ........... E04B 1/2403

OTHER PUBLICATIONS

European Search Report corresponding to Application No. 20201716.6-1005, dated Sep. 22, 2021.
Written Decision of the Authority of the International Preliminary Examination corresponding to International Application No. PCT/EP2021/078147, dated Jul. 7, 2022.
International Preliminary Report on Patentability dated Oct. 6, 2022, in corresponding International Application No. PCT/EP2021/078147.

* cited by examiner

CONNECTOR FOR TWO WORKPIECES

CROSS-REFERENCE TO RELATED APPLICATIONS

This application is a National Phase application of International Application No. PCT/EP2021/078147 filed Oct. 12, 2021 which claims priority to the European Patent Application No. 20 201 716.6 filed Oct. 14, 2020, the disclosures of which are incorporated herein by reference.

TECHNICAL FIELD

The present disclosed subject matter relates to a connector for two workpieces, comprising two fittings which each have a mounting face for a workpiece and an opposite connecting face, on which they can be hooked into one another in a hooking direction extending in parallel with the connecting face.

BACKGROUND

Connectors of this type are known from EP 1 856 417 B1 or EP 3 456 892 A1, for example, and are sold under the brand name RICON® by Knapp GmbH, Euratsfeld, Austria. They are particularly suitable for establishing heavy-duty connections in timber engineering, for example for connecting main beams, secondary beams, or crossbeams, cross pulls, trusses, supports, posts, walls, or the like. The fittings are usually made of metal, e.g. high-strength aluminum, and the workpieces to be connected are usually made of wood, for example glued laminated timber (GLT), glued laminated timber beams, etc. At least one of the workpieces may alternatively be made of concrete, stone, masonry, or even metal, for example.

In known connectors of this type, the two fittings are connected by two mirror-inverted dovetail joints, which are each formed by a projecting lug having an undercut on one fitting and a kind of dovetail groove on the other fitting. The dovetail grooves can deform or come apart under very high loads, which risks the joint loosening and, at worst, failing.

BRIEF SUMMARY

The aim of the disclosed subject matter is to further improve connectors of the type mentioned in relation to their load-bearing capacity, service life, and size, such that they can sustainably absorb greater forces while maintaining the same weight or size.

This aim is achieved by a connector of the type mentioned at the outset, which, according to the disclosed subject matter, is characterized in that each fitting comprises, on its connecting face, a shoulder which extends transversely to the hooking direction over its entire width and comprises an undercut, which leaves a ridge on the shoulder, and in that its end face remote from the shoulder and adjacent to the connecting face has a lip adjacent to the connecting face and extending over its entire width transversely to the hooking direction, the lip of each fitting engaging in the undercut in the respective other fitting in a first position of the fittings in which they are hooked into one another.

In the connector according to the disclosed subject matter, the main load arising in the hooking direction is now absorbed uniformly over the entire width of the connector by the ridges and lips and the undercuts or steps interacting therewith, instead of over narrow dovetail joints. This not only makes it possible to absorb particularly high loads, but also significantly increases the torsional strength of the connector about an axis normal to the connecting faces. As a result, without altering the secure anchoring of the two fittings to one another, the connector can absorb higher forces while remaining the same size or can absorb the same forces when it is a smaller size. Owing to the lips and ridges extending over the entire width, they only need to have a relatively small overlap with the undercuts or steps in the hooking direction, which means that there are short hooking paths when closing the connection and makes the workpieces significantly easier to handle when they are being connected.

In order to obtain a clearance-free connection of the fittings in the direction normal to the connecting faces, in this case, the thickness of the lip can be adapted to the clear width of the undercut as effectively as possible. If, however, such a clearance between the fittings is in fact desired, the thickness of the lip can in particular also be selected to be less than the clear width of the undercut.

In a first embodiment of the disclosed subject matter, the two fittings are constructed such that they can be interconnected in two different hooked positions as desired, specifically, in the above-mentioned first hooked position in which the lips of both fittings engage in the undercuts in both fittings and a second hooked position in which only the ridge of one fitting engages in the undercut in the other fitting. The latter may be useful in special mounting situations.

The latter latching option is particularly advantageous in connection with the optional embodiment of the connector in which the thickness of the ridge is less than the clear width of the undercut. Therefore, in the second hooked position, the ridge has a clearance in the undercut anyway owing to its comparatively low thickness. The two fittings hooked into the undercuts by their ridges thus act as a type of hinge about an axis parallel to the ridges. This can be useful in certain situations for mounting workpieces, e.g. a carrier on a vertical component, in order to be able to accommodate manufacturing tolerances, thermal expansion, expansion under load, etc., without overloading the mounting of the fittings on the workpieces.

In a first variant of the disclosed subject matter, the shoulder and its ridge as well as the end face and its lip each extend in a straight line over the width of the fitting. As a result, when the hooking direction between the two fittings is vertical, large horizontal bearing surfaces are available, which provide high torsional strength of the connector. This variant also makes it possible to easily switch between the two above-described hooked positions.

In a second variant of the disclosed subject matter, the shoulder and its ridge have a protrusion in the extension over the width of the fitting and said end face and its lip have an indentation that is complementary thereto in the extension over the width of the fitting. This combines some advantages of the known dovetail joints, such as mutual alignment or centering of the fittings transversely to the hooking direction, with the advantages of the disclosed subject matter of a bearing surface extending over the entire width of the fitting.

Optionally, in each of said embodiments, an aligning pin, which engages in an aligning notch in the lip during hooking in order to align the fittings with one another transversely to the hooking direction, can be arranged in the undercut.

The connector of the disclosed subject matter can be equipped with means for temporarily securing or latching the connection closed between the fittings. In a first embodiment of such securing or latching means, one fitting is equipped with a latching hook which can snap into a recess in the other fitting in a sprung manner. The latching hook can, in particular, be anchored at one end in a groove in the mounting face, can project over the lip at the other end, and can snap into the recess in the other fitting, which recess is formed on the shoulder of the latter. The latching hook that snaps into the recess in the other fitting simultaneously brings about centering or alignment of one fitting relative to the other in the direction transverse to the hooking direction in the plane of the connecting faces.

In a second embodiment of said securing or latching means, the connector additionally comprises a substantially U-shaped sprung bracket having hooked ends, which engages over one fitting and can snap into lateral recesses in the other fitting by its hooked ends. This bracket can also be attached later, after the fittings are hooked into one another, and thus secures the connection of said fittings both against becoming detached counter to the hooking direction and against shifting transversely to the hooking direction.

It is particularly advantageous for the central portion of the bracket between the hooked ends to extend to be substantially flush in a U-shaped recess in one fitting such that the bracket does not protrude and is thus protected against being unintentionally actuated or shifted.

In a particularly advantageous variant, the U-shaped recess has a central depression, into which the central portion of the bracket can be pressed in order to spread apart its hooked ends. This makes it possible to easily detach the bracket from being latched in the recesses, for example to disassemble the workpieces for repair or replacement.

According to a further optional feature of the disclosed subject matter, each fitting is penetrated both by holes normal to the mounting face and by holes oblique to the mounting face. As a result, the connector is also suitable for connecting workpieces at an angle or with a miter. In such a case, the tensile stresses and shear stresses between the mounting faces of the fittings and the workpieces enclose different angles depending on the installation situation, and by providing both straight and oblique mounting holes, the fittings can be securely anchored at a wide range of angles of traction and loading angles.

In a further possible configuration of the disclosed subject matter, the ridge of the shoulder can be extended to form a bearing plate projecting out from the connecting face of the fitting at an angle. As a result, the fitting fastened to the workpiece can additionally directly support the other workpiece by means of the bearing plate. Optionally, the bearing plate can comprise at least one hole that penetrates it in a normal or oblique manner, such that it can additionally be directly screwed to the other workpiece.

BRIEF DESCRIPTION OF THE DRAWINGS

The disclosed subject matter will be explained in greater detail in the following with reference to exemplary embodiments shown in the accompanying drawings, in which.

DETAILED DESCRIPTION

Figure 2:
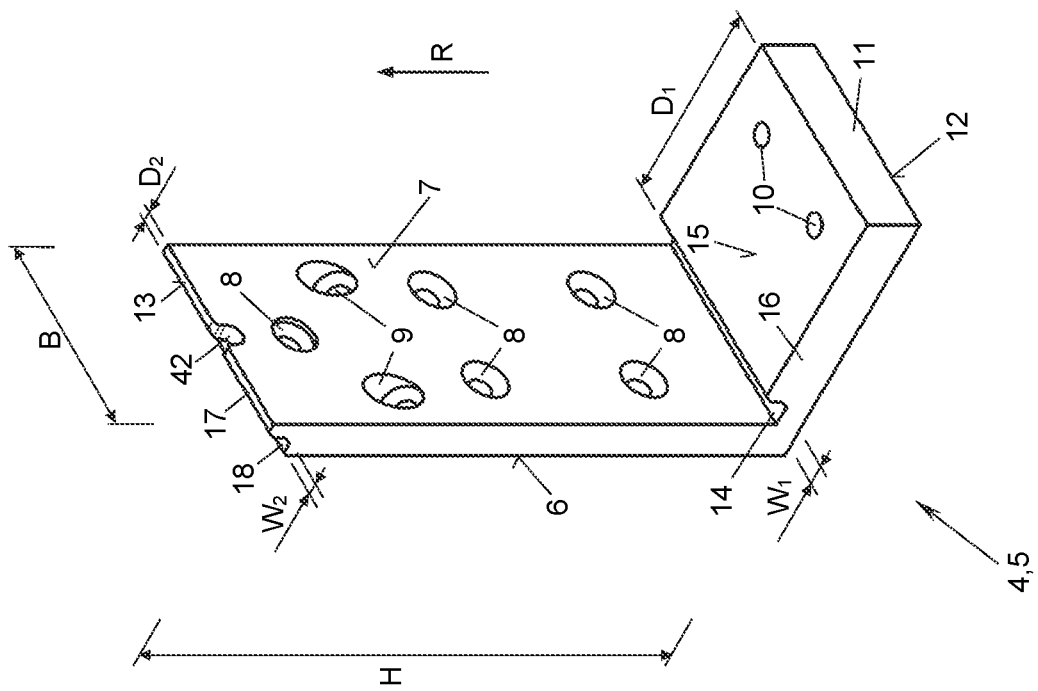
FIGS. 1 and 2 show a first embodiment of the connector of the disclosed subject matter in a first hooked position having schematically shown workpieces in a side view (FIG. 1) and on the basis of one of the two (identical) fittings of the connector in a perspective view (FIG. 2)
Figure 1:
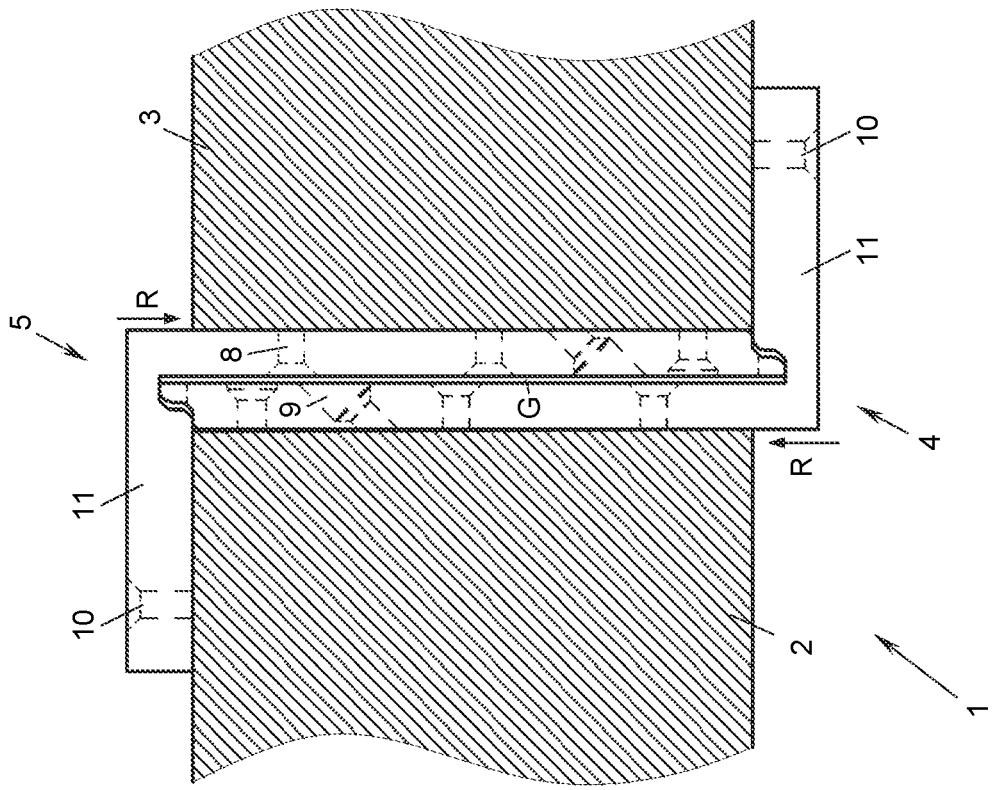

FIGS. 1 to 2 show a first embodiment of a connector 1 for two workpieces 2, 3. The workpieces 2, 3 can be made of wood, in particular glued laminated timber, of concrete, masonry, stone, metal, or the like, for example carriers and/or vertical components, e.g. supports, posts, or walls. The connector 1 comprises a first fitting 4 and a second fitting 5. The fittings 4, 5 optionally, but not necessarily, have the same construction (see FIG. 2) and are hooked into one another in a mirror-inverted manner; see FIG. 1.

Each fitting 4, 5 has a mounting face 6, by means of which it is mounted on one of the workpieces 2, 3, and an opposite connecting face 7, on which it can be connected to the other fitting 4, 5. For connection, the fittings 4, 5 are hooked into one another on their connecting faces 7 in a hooking direction R (which is vertical in this case) extending in parallel with the connecting faces 7, as described in greater detail in the following.

For mounting the fittings 4, 5 on the workpieces 2, 3, each fitting 4, 5 is provided with one or more holes 8, 9 for screws S (FIG. 3) to pass through, which engage in the workpieces 2, 3. The holes 8, 9 can penetrate the fittings 4, 5 at any angle, depending on the requirements. In the example shown, there are a plurality of holes 8 which penetrate the mounting face 6 of the respective fitting 4, 5 in a normal manner and a plurality of holes 9 which penetrate the mounting face 6 in an oblique manner. As a result, a wide range of traction directions can be accommodated between the respective workpiece 2, 3 and fitting 4, 5 toward the mounting face 6 depending on the installation situation and the angle between the workpieces 2, 3 or the inclination of each face of the workpieces 2, 3 to which the fittings 4, 5 are intended to be anchored.

As can be seen from FIG. 2 in particular, each fitting 4, 5 has, on its connecting face 7, a shoulder 11 which extends transversely to the hooking direction R over its entire width B. The shoulder 11 is optionally (if not necessarily) arranged eccentrically to the height H of the fitting 4, 5, i.e. close to one end face 12 of the fitting 4, 5 and remote from the opposite end face 13 of the fitting 4, 5, for example at ⅕, ¼ or ⅓ of the height H.

When viewed in the direction of the connecting face 7, the shoulder 11 has an undercut 14, i.e., when viewed counter to the hooking direction R and toward the end face 15 of the shoulder 11, a groove. This groove or undercut 14 leaves a ridge 16 on the shoulder 11. When viewed in the direction of the connecting face 7, the thickness of the ridge 16 is denoted by $D_1$ and the clear width (groove and gap width) of the undercut 14 is denoted by $W_1$.

The end face 13 of the fitting 4, 5 remote from the shoulder 11 and adjacent to the connecting face 7 is equipped with a lip 17 directly adjacent to the connecting face 7 and extending over the entire width B of the fitting 4, 5 transversely to the hooking direction R. When viewed in the direction of the connecting face 7, the lip 17 has a thickness $D_2$. When viewed in the direction of the connecting face 7, the lip 17 thus leaves a step 18 in the end face 13 "behind" said lip. The width of the step 18 in the direction normal to the connecting face 7 is denoted by $W_2$.

By means of the ridges 16 and undercuts 14 on the shoulders 11 and the lips 17 and steps 18 on the end faces 13, the fittings 4, 5 can then be hooked into one another in various positions, as described in the following.

In the hooked position, shown in FIG. 1, in the embodiment of FIGS. 1 and 2, the lip 17 of each fitting 4, 5 engages in the undercut 14 in the other fitting 5, 4, and therefore the ridge 16 of each fitting 4, 5 also simultaneously engages in the step 18 of the other fitting 5, 4. This results in the ridges 16 and lips 17 of one fitting 4, 5 being in contact with the entirety of the bottoms (bases) of the undercuts 14 and steps 18 in the other fitting 5, 4, which ensures that the load is carried uniformly.

In order to obtain a clearance-free connection between the fittings 4, 5 in the direction normal to the connecting faces 7, the thickness $D_2$ of the lips 17 can be adapted to the clear width $W_1$ of the undercuts 14 as effectively as possible, i.e. is identical or is slightly lower such that it is possible to hook the lips 17 into the undercuts 14 in the hooking direction R in a sliding manner.

Alternatively, the thickness $D_2$ of the lips 17 can also be significantly less than the clear width $W_1$ of the undercuts 14, in order to establish a noticeable clearance in the gap G between the fittings 4 and 5 in the direction normal to their connecting faces 7.

In the embodiment shown in FIGS. 1 and 2, the thickness $D_1$ of the ridges 16 is exceedingly high, such that each ridge 16 is extended to form a bearing plate projecting out from the connecting face 7 of the respective fitting 4, 5 at an angle, so to speak. The lower face of the other workpiece 2, 3 can thus be supported on this bearing plate formed by the ridge 16 of the shoulder 11, for example, as shown in FIG. 1. In this way, the fitting 4 mounted on the workpiece 2 by its mounting face 6 can engage with the other workpiece 3 not only by means of the opposing fitting 5, but additionally in a supporting manner by means of its ridge 16 (constructed as a bearing plate), and, vice versa, the other fitting 5 can engage with the workpiece 2. Optionally, in this case, the ridge 16 can be provided with one or more holes 10 in order to screw it to the other workpiece 3. The holes 10 can penetrate the shoulder 11 so as to be both normal to and oblique to the end face 15 of said shoulder.

Figure 4:
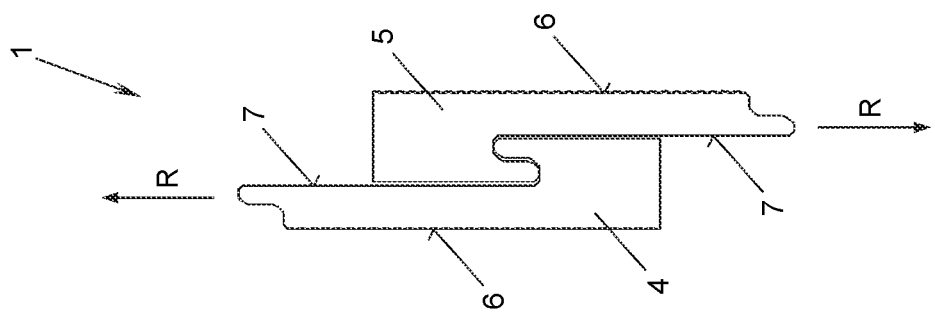
FIGS. 3 to 5 show a second embodiment of the connector of the disclosed subject matter in the first hooked position having schematically shown workpieces in a side view (FIG. 3), in a second hooked position in a side view (FIG. 4), and on the basis of one of the two (identical) fittings of the connector in a perspective view (FIG. 5)
Figure 3:
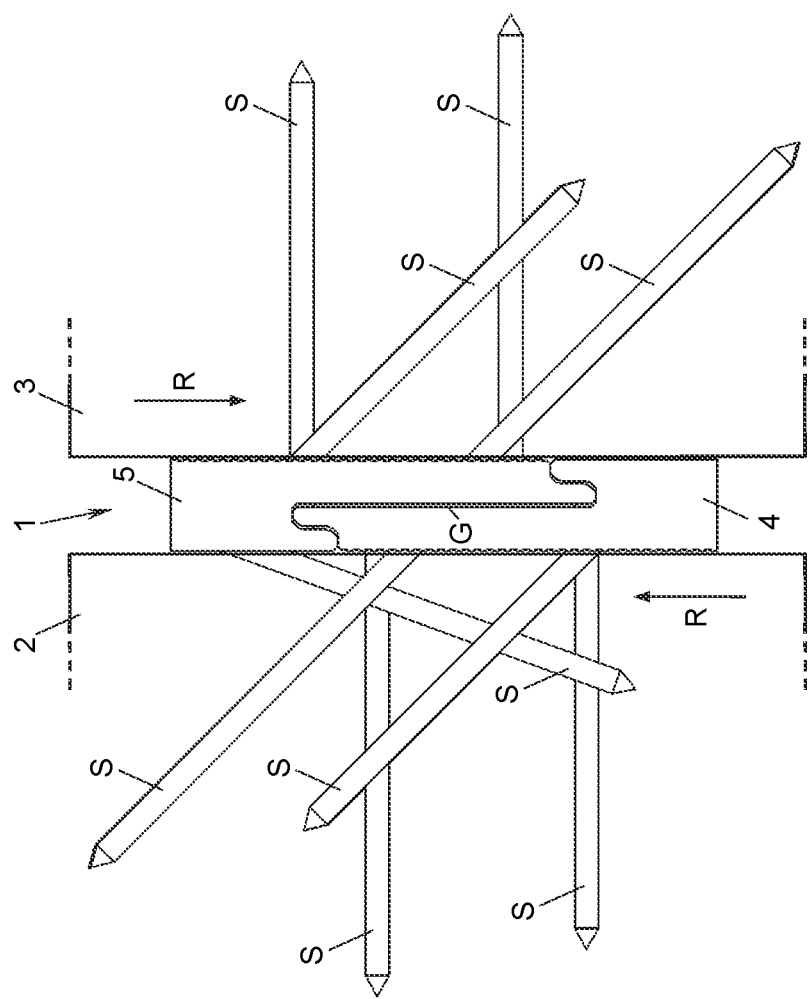
Figure 5:
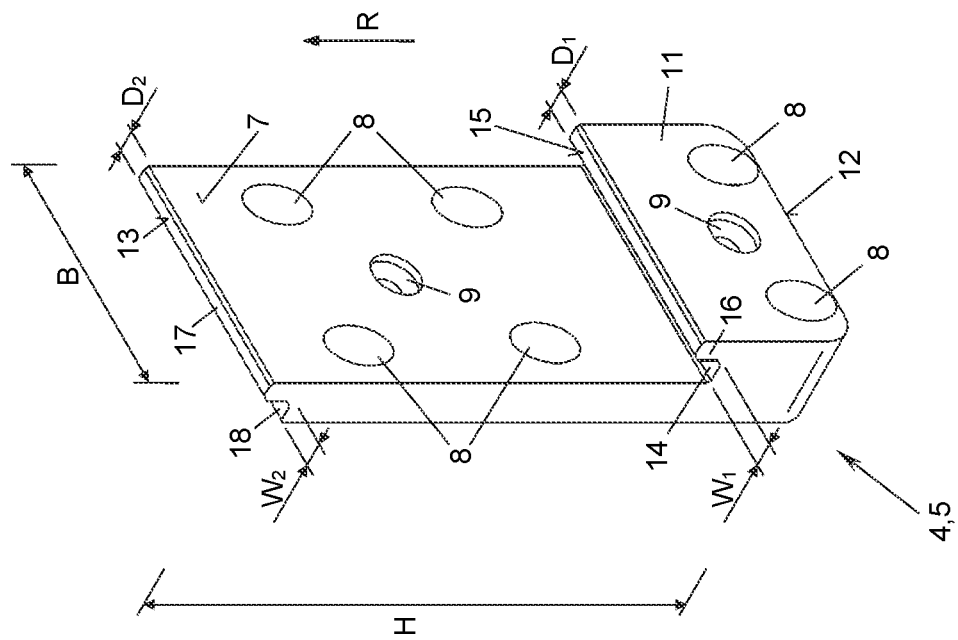

FIGS. 3-5 show a second embodiment of the connector 1 in which the thickness $D_1$ of the ridges 16 is less than or equal to the clear width $W_1$ of the undercuts 14 of the fittings 4, 5. Therefore, as in FIG. 1, the fittings 4, 5 can be hooked into one another in a first hooked position according to FIG. 3 on one hand, but alternatively can also be hooked into one another in a second hooked position shown in FIG. 4 on the other hand. In this position, the ridge 16 of each fitting 4, 5 engages in the undercut 14 in the other fitting 5, 4.

If the thickness $D_1$ of the ridges 16 is less than the clear width $W_1$ of the undercuts 14, there is a clearance between the two fittings 4, 5 in the direction normal to the connecting faces 7, such that the fittings 4, 5 can also tilt slightly relative to one another, specifically about an axis that extends in parallel with the ridges 16. The shoulders 11 of the two fittings 4, 5 which are hooked into one another then act as a type of hinge.

In order to allow the fittings 4, 4 that are hooked into one another to be in contact with the entirety of the workpieces 2, 3 as far as possible in the first hooked position (FIG. 3), the thickness $D_1$ of the ridges 16 can optionally be adapted to the width $W_2$ of the steps 18 as effectively as possible.

It goes without saying that the load-carrying capacity of the connector 1 in the hooking direction R in the double-hooked position in FIGS. 1 and 3 is greater than in the hinged hooked position in FIG. 4.

In the embodiments of the connector 1 in FIGS. 1 to 5, the shoulders 11 and their ridges 14 as well as the end faces 13 and their lips 17, optionally also the undercuts 14 and steps 18, each extend in a straight line over the entire width B of the fitting 4, 5, and specifically in particular in a straight line horizontally in the vertical installation position shown. By contrast, FIG. 6 shows an alternative embodiment of the fittings 4, 5 (which are optionally identical to one another) of the connector 1 in which these contact surfaces do not extend in a straight line.

Figure 6:
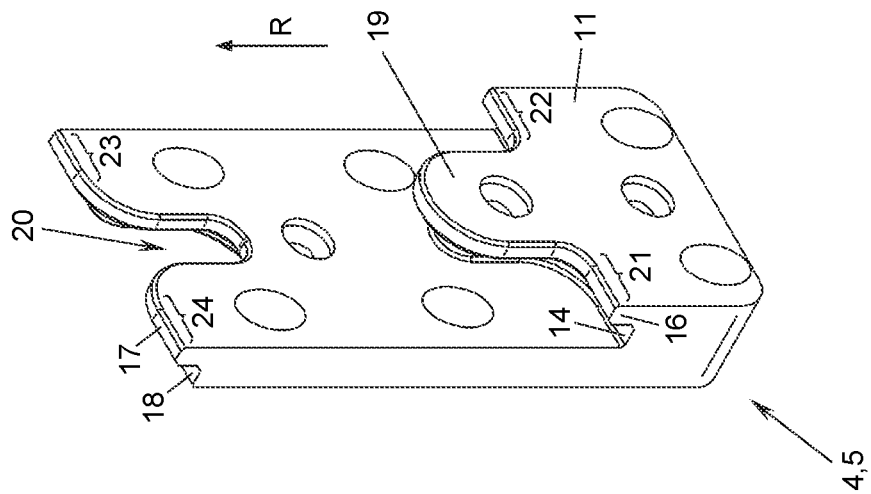
FIG. 6 shows a third embodiment of the connector of the disclosed subject matter on the basis of one of its two (identical) fittings in a perspective view.

In the embodiment in FIG. 6, the shoulder 11 and its ridge 16, optionally also its undercut 14, have a protrusion 19 in the extension over the width B of the fitting 4, 5, and the end face 13 remote from the shoulder and its lip 17, optionally also its step 18, have, in a similar manner, an indentation 20 that is complementary thereto in the extension over the width B of the fitting 4, 5. The protrusion 19 and the indentation 20 form a type of dovetail joint when the fittings 4, 5 are hooked into one another and center or align them to one another when viewed in the extension direction of the width B.

As can be seen from FIG. 6, the shoulders 11, ridges 16, undercuts 14, lips 17, and steps 18 each have a straight (i.e. horizontal) extension in their portions 21-24 adjacent to the protrusions and indentations 19, 20 in order to produce large contact surfaces between the fittings 4, 5 in the hooking direction R.

Figure 9:
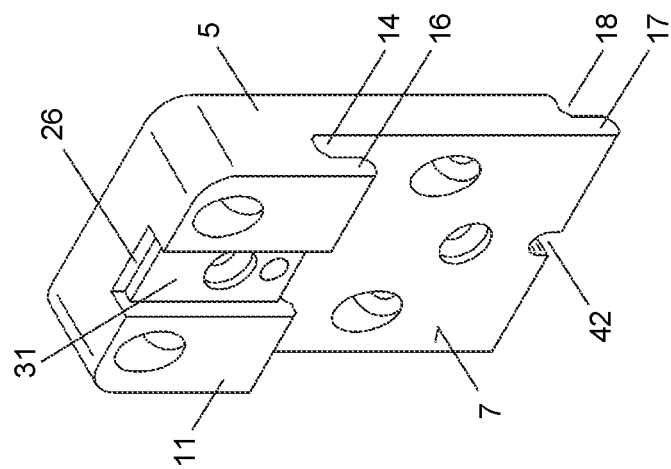
FIGS. 7 to 9 show a fourth embodiment of the connector of the disclosed subject matter in the first hooked position in a perspective view (FIG. 7), and shows the two fittings of the connector individually in perspective views in each case (FIGS. 8 and 9)
Figure 8:
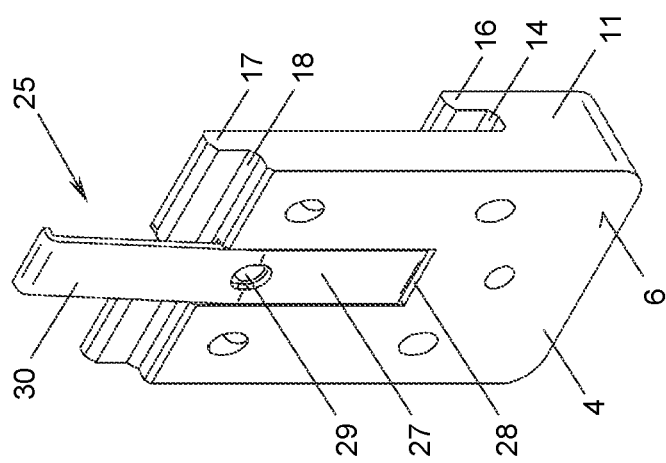
Figure 7:
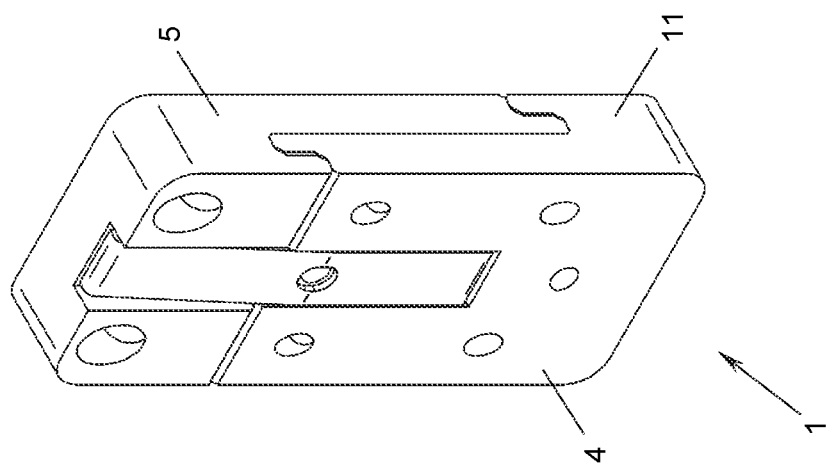

FIGS. 7 to 9 show a further embodiment of the connector 1 in which at least one of the fittings 4, 5, in this case, the fitting 4, is equipped with a latching hook 25. The latching hook 25 of the fitting 4 can snap into a corresponding recess 26 in the other fitting 5, in this case arranged on its shoulder 11.

In the example shown, the latching hook 25 is anchored at one end 27 in a groove 28 in the mounting face 6 of the fitting 4. For example, the end 27 is loosely inserted into the groove 28 so as to be flush with the surface and is retained by one of the screws S, which penetrate a hole 29 in the latching hook 25 aligned with the holes 8. Alternatively, the latching hook 25 could be constructed to be bonded, screwed, or welded to the fitting 4, or could even be formed in one piece with said fitting.

The hooked end 30 of the latching hook 25 that projects out from the fitting 4 can be guided in a groove 31 in the other fitting 5 on its way to the recess 26 in the fitting 5.

In the embodiment in FIGS. 7 to 9, too, the fittings 4, 5 can be formed to be identical, i.e. the other fitting 5 can also have a groove 28 for anchoring a second latching hook 25, which engages in a groove 31 and recess 26 in one fitting 4.

Figure 12:
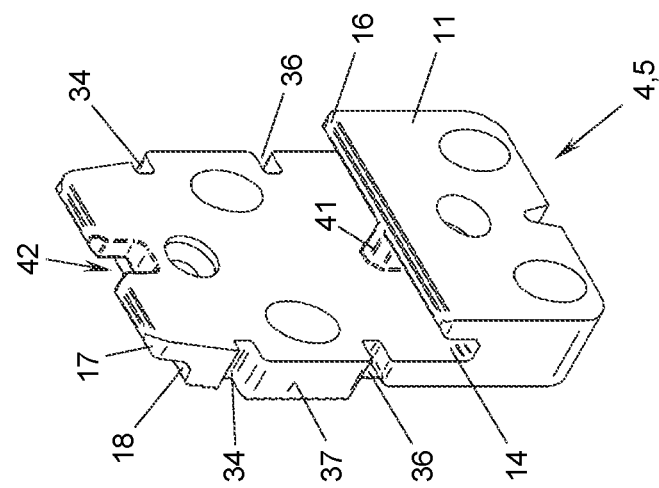
FIGS. 10 to 12 show a fifth embodiment of the connector of the disclosed subject matter once in the first hooked position having a tool to detach the securing bracket in a perspective view (FIG. 10), once during the detaching or hooking in a perspective view (FIG. 11), and once on the basis of one of the two (identical) fittings of the connector in a perspective view (FIG. 12).
Figure 11:
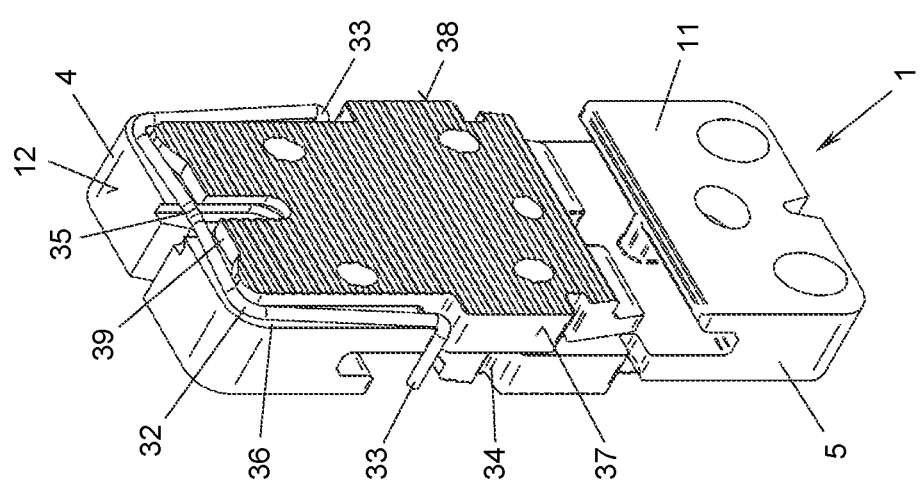
Figure 10:
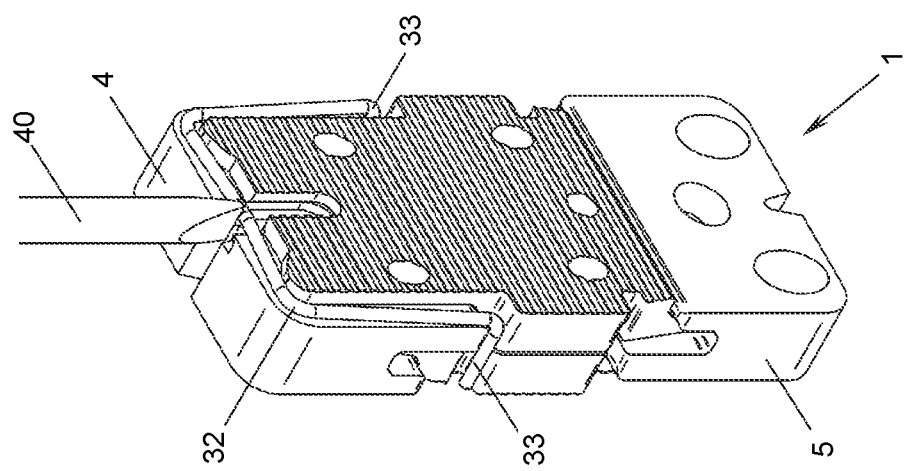

FIGS. 10 to 12 show a further embodiment of the connector 1. Here, the connector 1 comprises a substantially U-shaped sprung bracket 32 having hooked ends 33. The bracket 32 engages over one fitting 4 and snaps into lateral recesses 34 in the other fitting 5 in a sprung manner by its hooked ends 33 in the hooked position of the fittings shown in FIG. 10. In this case, the central portion 35 of the bracket 32 between the hooked ends 33 extends to be substantially flush in a U-shaped recess 36 in one fitting 4. The recess 36 extends over the end face 12 close to the shoulder and over an adjoining part of the lateral sides 37, 38 of one fitting 4, for example centrally or (as in this case) at the edge of the fitting 4.

The U-shaped recess 36 has a central depression 39, and specifically in the central region of its portion extending over the end face 12 close to the shoulder. If the central region of the central portion 35 of the bracket 32 is pressed into the depression 39 by means of a tool 40, the bracket 32 bends inwards in a concave manner at that point and its hooked ends 33 are spread apart such that they unlatch from the recesses 34. This can release the fittings 4, 5 from one another again counter to the hooking direction R.

In the embodiment in FIGS. 10 to 12, the fittings 4, 5 can optionally (if not necessarily) also have an identical configuration, i.e. the other fitting 5 can also be equipped with a U-shaped recess 36 for receiving a second U-shaped sprung bracket 32.

In each embodiment, as shown in FIGS. 11 and 12, an aligning pin 41, which engages in an aligning notch 42 in the lip 17 during hooking in order to align the fittings 4, 5 with one another transversely to the hooking direction R, can optionally be arranged in the undercut 14 in at least one fitting 4, 5. Alignment of this kind by way of a pin and notch or a tongue and groove can also be obtained by means of other alignment means between the fittings 4, 5, for example a complementary configuration of their connecting faces 7 in order to prevent any unintentional shifting in the plane of the connecting faces 7 transversely to the hooking direction R.

The features of the above-described embodiments can also be combined in any way. The disclosed subject matter is accordingly not limited to the embodiments set out, but instead covers all the variants, modifications, and the combinations thereof that fall within the scope of the accompanying claims.

What is claimed is:

1. A connector for two workpieces, comprising:
two fittings which each have a mounting face for a workpiece and an opposite connecting face, on which they can be hooked into one another in a hooking direction extending in parallel with the connecting face,
wherein each fitting comprises, on the connecting face, a shoulder which extends transversely to the hooking direction over an entire width of the fitting and comprises an undercut, which leaves a ridge on the shoulder,
wherein an end face of each fitting, which end face is remote from the shoulder and adjacent to the connecting face, has a lip adjacent to the connecting face and extending over said entire width transversely to the hooking direction,
wherein the lip of each fitting engages in the undercut in the respective other fitting in a first position of the fittings in which they are hooked into one another, and
wherein the shoulder and the ridge have a protrusion in the extension over the width of the fitting and said end face and the lip have an indentation that is complementary to the protrusion in the extension over the width of the fitting.

2. The connector according to claim 1, wherein a thickness of the lip is less than a clear width of the undercut.

3. The connector according to claim 1, wherein the ridge of one fitting engages in the undercut in the other fitting in a second position of the fittings in which they are hooked into one another.

4. The connector according to claim 1, wherein a thickness of the ridge is less than a clear width of the undercut.

5. A connector for two workpieces, comprising:
two fittings which each have a mounting face for a workpiece and an opposite connecting face, on which they can be hooked into one another in a hooking direction extending in parallel with the connecting face,
wherein each fitting comprises, on the connecting face, a shoulder which extends transversely to the hooking direction over an entire width of the fitting and comprises an undercut, which leaves a ridge on the shoulder,
wherein an end face of each fitting, which end face is remote from the shoulder and adjacent to the connecting face, has a lip adjacent to the connecting face and extending over said entire width transversely to the hooking direction,
wherein the lip of each fitting engages in the undercut in the respective other fitting in a first position of the fittings in which they are hooked into one another, and
wherein an aligning pin, which engages in an aligning notch in the lip during hooking in order to align the fittings with one another transversely to the hooking direction, is arranged in the undercut.

6. The connector according to claim 5, wherein one fitting is equipped with a latching hook which can snap into a recess in the other fitting in a sprung manner.

7. The connector according to claim 6, wherein the latching hook is anchored at one end in a groove in the mounting face and projects over the lip at the other end and can snap into the recess in the other fitting, which recess is formed on the shoulder of the latter.

8. The connector according to claim 1, further comprising a substantially U-shaped sprung bracket having hooked ends, which engages over one fitting and can snap into lateral recesses in the other fitting by the hooked ends.

9. The connector according to claim 8, wherein a central portion of the bracket between the hooked ends extends to be substantially flush in a U-shaped recess in one fitting.

10. The connector according to claim 9, wherein the U-shaped recess has a central depression, into which the central portion of the bracket can be pressed in order to spread apart the hooked ends.

11. The connector according to claim 1, wherein each fitting is penetrated both by holes normal to the mounting face and by holes oblique to the mounting face.

12. A connector for two workpieces, comprising:
two fittings which each have a mounting face for a workpiece and an opposite connecting face, on which they can be hooked into one another in a hooking direction extending in parallel with the connecting face,
wherein each fitting comprises, on the connecting face, a shoulder which extends transversely to the hooking direction over an entire width of the fitting and comprises an undercut, which leaves a ridge on the shoulder,
wherein an end face of each fitting, which end face is remote from the shoulder and adjacent to the connecting face, has a lip adjacent to the connecting face and extending over said entire width transversely to the hooking direction, wherein the lip of each fitting engages in the undercut in the respective other fitting in a first position of the fittings in which they are hooked into one another, and wherein the ridge is extended to form a bearing plate projecting out from the connecting face at an angle, such that each fitting mounted on one of the workpieces by its mounting face can engage with the other one of the workpieces not only by the respective other fitting, but additionally in a supporting manner by each fitting's bearing plate.

13. The connector according to claim 12, wherein the bearing plate comprises at least one hole that penetrates the bearing plate in a normal or oblique manner.

14. The connector according to claim 5, wherein a thickness of the lip is less than a clear width of the undercut.

15. The connector according to claim 5, wherein the ridge of one fitting engages in the undercut in the other fitting in a second position of the fittings in which they are hooked into one another.

16. The connector according to claim 5, wherein a thickness of the ridge is less than a clear width of the undercut.

17. The connector according to claim 5, further comprising a substantially U-shaped sprung bracket having hooked ends, which engages over one fitting and can snap into lateral recesses in the other fitting by the hooked ends.

18. The connector according to claim 17, wherein a central portion of the bracket between the hooked ends extends to be substantially flush in a U-shaped recess in one fitting.

19. The connector according to claim 18, wherein the U-shaped recess has a central depression, into which the central portion of the bracket can be pressed in order to spread apart the hooked ends.

20. The connector according to claim 5, wherein each fitting is penetrated both by holes normal to the mounting face and by holes oblique to the mounting face.

* * * * *